United States Patent
Suzuki (10) Patent No.: US 8,803,820 B2
(45) Date of Patent: Aug. 12, 2014

(54) TOUCH DETECTION DEVICE, ELECTRONIC DEVICE AND RECORDING MEDIUM

(75) Inventor: Maho Suzuki, Tokyo (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 454 days.

(21) Appl. No.: 12/910,253

(22) Filed: Oct. 22, 2010

(65) Prior Publication Data

US 2011/0096011 A1     Apr. 28, 2011

(30) Foreign Application Priority Data

Oct. 22, 2009   (JP) ................. 2009-243758

(51) Int. Cl.
   *G06F 3/041*     (2006.01)
(52) U.S. Cl.
   USPC .......................................... 345/173
(58) Field of Classification Search
   None
   See application file for complete search history.

(56) References Cited

U.S. PATENT DOCUMENTS

| 7,916,967 | B2 * | 3/2011 | Takita et al. | 382/274 |
| 2010/0053097 | A1 * | 3/2010 | Goh et al. | 345/173 |
| 2011/0115729 | A1 * | 5/2011 | Kremin et al. | 345/173 |

FOREIGN PATENT DOCUMENTS

| CN | 101369200 | 2/2009 |
| JP | 6-12510 | 2/1994 |
| JP | 2005-293374 | 10/2005 |
| JP | 2007-011228 | 1/2007 |
| JP | 2007-072798 | 3/2007 |
| WO | 2007/032305 | 3/2007 |

OTHER PUBLICATIONS

Notice of Reasons for Rejection issued Jun. 4, 2013 by the Japanese Patent Office in Japanese Patent Application No. 2009-243758, with partial English translation.
CN Office Action dated Mar. 3, 2014, with English Translation; Application No. 201010528284.3.

* cited by examiner

*Primary Examiner* — Joe H Cheng
*Assistant Examiner* — Yaron Cohen
(74) *Attorney, Agent, or Firm* — Young & Thompson (57) ABSTRACT

A touch position calculation unit 113 calculating the touch position based on detected intensities at a touch panel unit 150 compares the detected intensities with a threshold to determine whether the touch is valid. Here, since display noise caused by the display screen of a display unit 132 affects the touch detection, the touch position calculation unit 113 acquires the display state of the display unit 132 from a display control unit 112. The touch position calculation unit 113 makes reference to a condition list stored in a memory 160 and sets up a threshold corresponding to the display state as the touch detection condition. Information indicating the display state includes the screen design typified by coloration patterns and the total gradation value corresponding to the voltage applied to the screen.

14 Claims, 10 Drawing Sheets

| DISPLAY STATE (SCREEN DESIGN) | DETECTION CONDITION (THRESHOLD) |
|---|---|
| DESIGN A | THRESHOLD THn1 (DEFAULT) |
| DESIGN B | |
| DESIGN C | THRESHOLD THn2 |
| DESIGN D | THRESHOLD THn3 |
| DESIGN E | THRESHOLD THn4 |
| ⋮ | ⋮ |

● ACTUAL TOUCH POSITION
= POSITION TO BE CALCULATED

● POSITIONS AROUND THE TOUCH POSITION WHERE CAPACITANCE CHANGE OCCURS

FIG. 4A
BLACK-TONED DISPLAY

FIG. 4B
GREEN-TONED DISPLAY

BLACK — GREEN

FIG. 4C
APPLIED VOLTAGE

SMALL DIFFERENCE IN VOLTAGE

DISPLAY NOISE: LOW

FIG. 4D
APPLIED VOLTAGE

LARGE DIFFERENCE IN VOLTAGE

DISPLAY NOISE: HIGH

FIG. 4E
DETECTED INTENSITY

FIG. 4F
DETECTED INTENSITY

| DISPLAY STATE (SCREEN DESIGN) | DETECTION CONDITION (THRESHOLD) |
|---|---|
| DESIGN A | THRESHOLD THn1 (DEFAULT) |
| DESIGN B | |
| DESIGN C | THRESHOLD THn2 |
| DESIGN D | THRESHOLD THn3 |
| DESIGN E | THRESHOLD THn4 |
| ⋮ | ⋮ |

| DISPLAY STATE (TOTAL GRADATION VALUE) | DETECTION CONDITION (THRESHOLD) |
|---|---|
| LOWER THAN Sa | THRESHOLD THn1 |
| NOT LOWER THAN Sa AND LOWER THAN Sb | THRESHOLD THn2 |
| NOT LOWER THAN Sb | THRESHOLD THn3 |

| DISPLAY STATE (STILL IMAGE/VIDEO IMAGE) | DETECTION CONDITION (THRESHOLD) |
|---|---|
| STILL IMAGE | THRESHOLD THn1 |
| VIDEO IMAGE (LOW MOTION LEVEL) | THRESHOLD THn2 |
| VIDEO IMAGE (HIGH MOTION LEVEL) | THRESHOLD THn3 |

TOUCH DETECTION DEVICE, ELECTRONIC DEVICE AND RECORDING MEDIUM

INCORPORATION BY REFERENCE

This application is based on Japanese Patent Application No. 2009-243758 filed on Oct. 22, 2009 and including specification, claims, drawings and summary. The disclosure of the above Japanese Patent Application is incorporated herein by reference in its entirety.

TECHNICAL FIELD

The present invention relates to a touch detection device, an electronic device, and a recording medium, and particularly to a touch detection device suitable for touch panel input, an electronic device, and a recording medium.

BACKGROUND ART

It has become common in electronic devices having a display screen such as mobile communication terminals (cellular phones) to configure the display unit with a touch panel wherein the user touches the screen for input. The touch panel allows for a more intuitive input operation and provides a useful input method, particularly to mobile communication terminals having smaller keys.

Many such electronic devices have a liquid crystal panel as the display unit. When a capacitive touch panel is configured in the liquid crystal panel, driving of the liquid crystal panel can be a noise source and may affect capacitance change due to finger touch. As a result, user finger touch may not be properly detected.

The driving of a liquid crystal panel that may be responsible for detection errors varies depending on the display state such as screen design. In other words, the quantity of display noise varies depending on the display screen at the time. For example, in a so-called normally black liquid crystal that is black when no voltage is applied to the R, G, and B colors, there is little fluctuation in the drive voltage when a black screen is displayed because the voltage applied to the pixels is "0." Conversely, when voltage is applied to G pixels among R, G, and B pixels to display a green screen, the difference in the voltage between adjacent pixels is most remarkable and noise is increased compared with the black screen.

As described above, the quantity of display noise varies depending on the display color constituting the display screen. The tendency for touch panel detection errors to occur on the touch panel affected by display noise is related to the screen design. Therefore, such a relationship can presumably be used to reduce detection errors.

Touch panel detection errors often occur due to influence of the above external factors. Techniques for reducing detection errors, for example, by taking into consideration environmental change such as temperature change (for example, Patent Literature 1) or by changing detection conditions depending on whether the back light is ON or OFF (for example, Patent Literature 2) have been proposed.

CITATION LIST

Patent Literature

[Patent Literature 1] Examined Japanese Patent Application KOKOKU Publication No. H6-12510; and

[Patent Literature 2] Unexamined Japanese Patent Application KOKAI Publication No. 2007-72798.

SUMMARY

However, there is no technique for reducing touch panel detection errors based on the above-described cause-and-effect relationship with the display screen.

The present invention is made in view of the above circumstances and an exemplary objective of the present invention is to more efficiently reduce touch panel detection errors.

In order to achieve the above objective, the touch detection device according to a first exemplary aspect of the present invention is a touch detection device having:

a display unit providing screen display;

a touch panel configured on the display screen of the display unit; and a touch detection unit detecting touch to the touch panel based on detection signals at the touch panel, wherein the touch detection device includes a condition determination unit determining touch detection conditions based on the screen displayed by the display unit; and the touch detection unit detects touch using a touch detection condition determined by the condition determination unit.

In the above touch detection device, desirably, the condition determination unit determines a threshold for making a comparison with the detection signals as a touch detection condition.

In the above touch detection device, desirably, the condition determination unit determines the touch detection condition based on the display state corresponding to display noise due to the screen displayed by the display unit.

In the above touch detection device, the condition determination unit may determine the touch detection condition based on the relationship between the screen design of the screen displayed by the display unit and the display noise.

In the above touch detection device, the condition determination unit may determine the touch detection condition based on the relationship between the applied voltage of the screen displayed by the display unit and the display noise.

In such a case, the condition determination unit desirably further includes a calculation unit calculating the total gradation value of the screen and desirably determines the touch detection condition based on the total gradation value calculated by the calculation unit.

In the above touch detection device, desirably, the condition determination unit determines a lower threshold value as the touch detection condition when the applied voltage is higher.

The above touch detection device may further include an error detection unit detecting touch detection errors, and in such a case, desirably, the condition determination unit determines the touch detection conditions based on the screen displayed by the display unit when the error detection unit detects a touch detection error, and the condition determination unit determines a given touch detection condition when the error detection unit detects no touch detection error.

In such a case, desirably, the condition determination unit determines a touch detection condition based on the screen displayed by the display unit when the error detection unit detects a touch detection error for the first time.

The above touch detection device desirably further includes a memory storing a condition list associating information indicating the display state with touch detection conditions, and in such a case, desirably, the condition determination unit determines a touch detection condition based on the condition list stored in the memory.

In order to achieve the above objective, the electronic device according to a second exemplary aspect of the present invention is an electronic device including:

the above touch detection device; and an electronic device body housing the touch detection device.

In order to achieve the above objective, the computer-readable recording medium in which programs are recorded according to a third exemplary aspect of the present invention is a computer-readable recording medium in which programs are recorded wherein the programs allow a computer controlling a touch detection device including:

a display unit providing screen display;

a touch panel configured on the display screen of the display unit; and a touch detection unit detecting touch to the touch panel based on detection signals at the touch panel to realize the following functions:

determining a touch detection condition based on the screen displayed by the display unit; and detecting touch using the determined touch detection condition.

The present invention can more effectively reduce touch panel detection errors.

BRIEF DESCRIPTION OF THE DRAWINGS

These objects and other objects and advantages of the present invention will become more apparent upon reading of the following detailed description and the accompanying drawings in which:

FIGS. 3A to 3D are illustrations for explaining the touch detection operation.

FIGS. 4A to 4F are illustrations for explaining the relationship between the display screen and touch detection errors.

FIGS. 8A to 8C are illustrations for explaining the operation in the "touch input process (2)" shown in FIG. 7.

EXEMPLARY EMBODIMENT

An embodiment of the present invention is described hereafter with reference to the drawings. In this embodiment, the present invention is applied to a mobile communication terminal.

Figure 1:
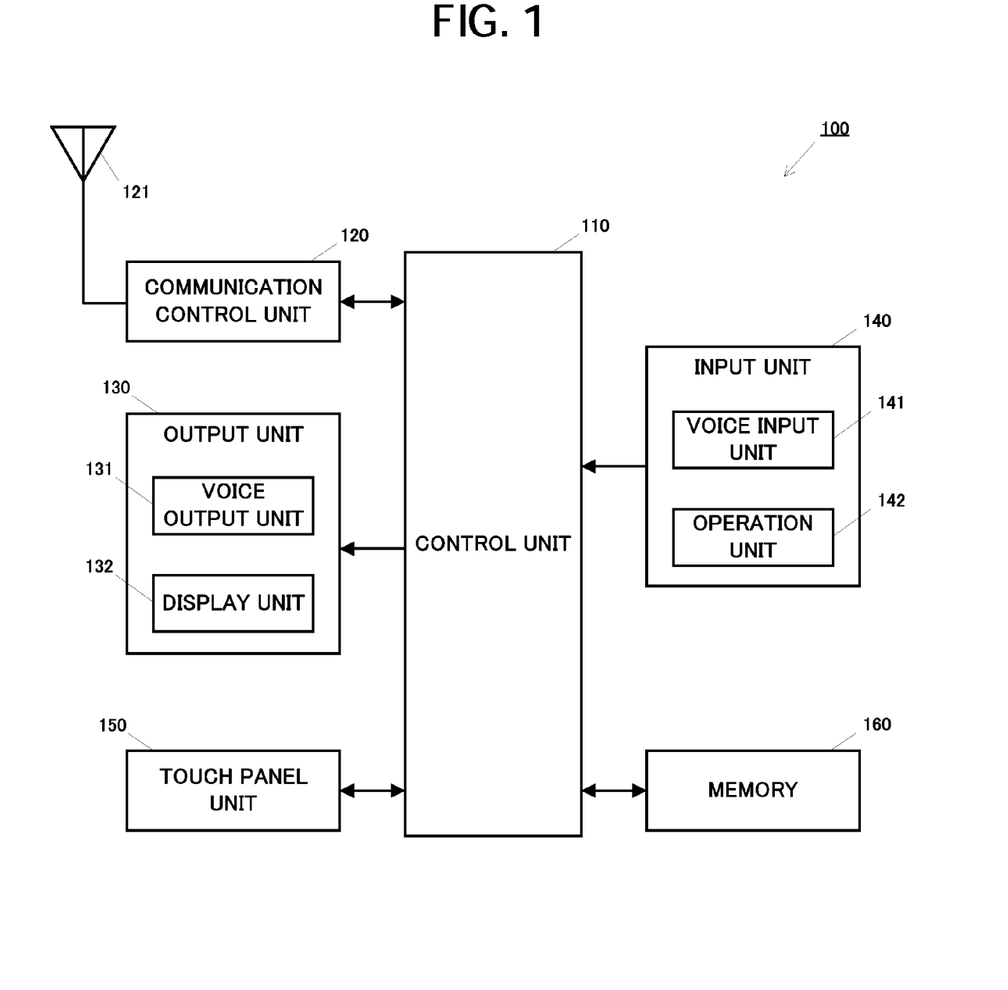
FIG. 1 is a block diagram showing the configuration of a mobile communication terminal according to an embodiment of the present invention.

The configuration of a mobile communication terminal 100 of this embodiment is described with reference to FIG. 1. FIG. 1 is a block diagram showing the configuration of a mobile communication terminal 100. As shown in the figure, the mobile communication terminal 100 are composed of a control unit 110, a communication control unit 120, an output unit 130, an input unit 140, a touch panel unit 150, a memory 160, and so on.

The control unit 110 is composed of arithmetic processing circuits including a CPU (central processing unit), a RAM (random access memory) as a work area, and various drivers. The control unit 110 controls the units of the mobile communication terminal 100 and executes the procedures, which will be described later, based on given operation programs stored in the memory 160. The components of the mobile communication terminal 100, which will be described later, are each connected to the control unit 110. Data exchange between the components is conducted via the control unit 110.

The communication control unit 120 is composed of, for example, a radio communication circuit for cellular communication. The communication control unit 120 conducts radio communication via an antenna 121 to realize basic functions of the mobile communication terminal 100 such as voice telephone calls and data communication.

The output unit 130 is composed of a voice output unit 131, a display unit 132, and so on and conducts output operation of various information from the mobile communication terminal 100.

The voice output unit 131 is composed of, for example, a speaker and outputs a ringtone and received voice upon telephone calls.

The display unit 132 is composed of, for example, a liquid crystal display and displays various screens regarding the functions of the mobile communication terminal 100. The display unit 132 of this embodiment is a display unit using a liquid crystal panel in which a voltage is applied to R, G, and B cells for display and the liquid crystal panel is a normally black liquid crystal panel that displays "black" when the voltage applied to the R, G, and B pixels is 0.

The input unit 140 is composed of a voice input unit 141, an operation unit 142, and so on and functions as an interface for the user input to the mobile communication terminal 100.

The voice input unit 141 is composed of, for example, a microphone and used to input the user's speech upon telephone calls.

The operation unit 142 is composed of a keypad (character keys (numeric keys), arrow keys, and so on) and function buttons provided on the enclosure of the mobile communication terminal 100 and generates input signals according to the user operation for input to the control unit 110.

The input unit of this embodiment includes, in addition to the operation unit 142, the touch panel unit 150 configured in the display unit 132 to detect finger touch to the display screen of the display unit 132 for input operation.

The touch panel unit 150 of this embodiment includes a touch sensor composed of a transparent electrode film made of, for example, ITO (indium tin oxide) and forming a matrix of electrodes on the display screen of the display unit 132, and generates detection signals according to the finger touch to the touch sensor. In this embodiment, the touch panel is of a capacitance type and, in such a case, a touch sensor changing capacitance according to the finger touch is configured.

The memory 160 is composed of a given memory unit such as a ROM (read only memory) and flash memory and stores operation programs (applications) executed by the control unit 110, and data necessary for executing various procedures and data generated through execution of the procedures.

The operation programs stored in the memory 160 include any basic programs taking charge of basic operations of the mobile communication terminal 100 (namely OS (operating system)) and operation programs for realizing various procedures (application programs), which will be described later. The procedures of the mobile communication terminal 100 that are described later are realized by the control unit 110 executing these operation programs.

Figure 2:
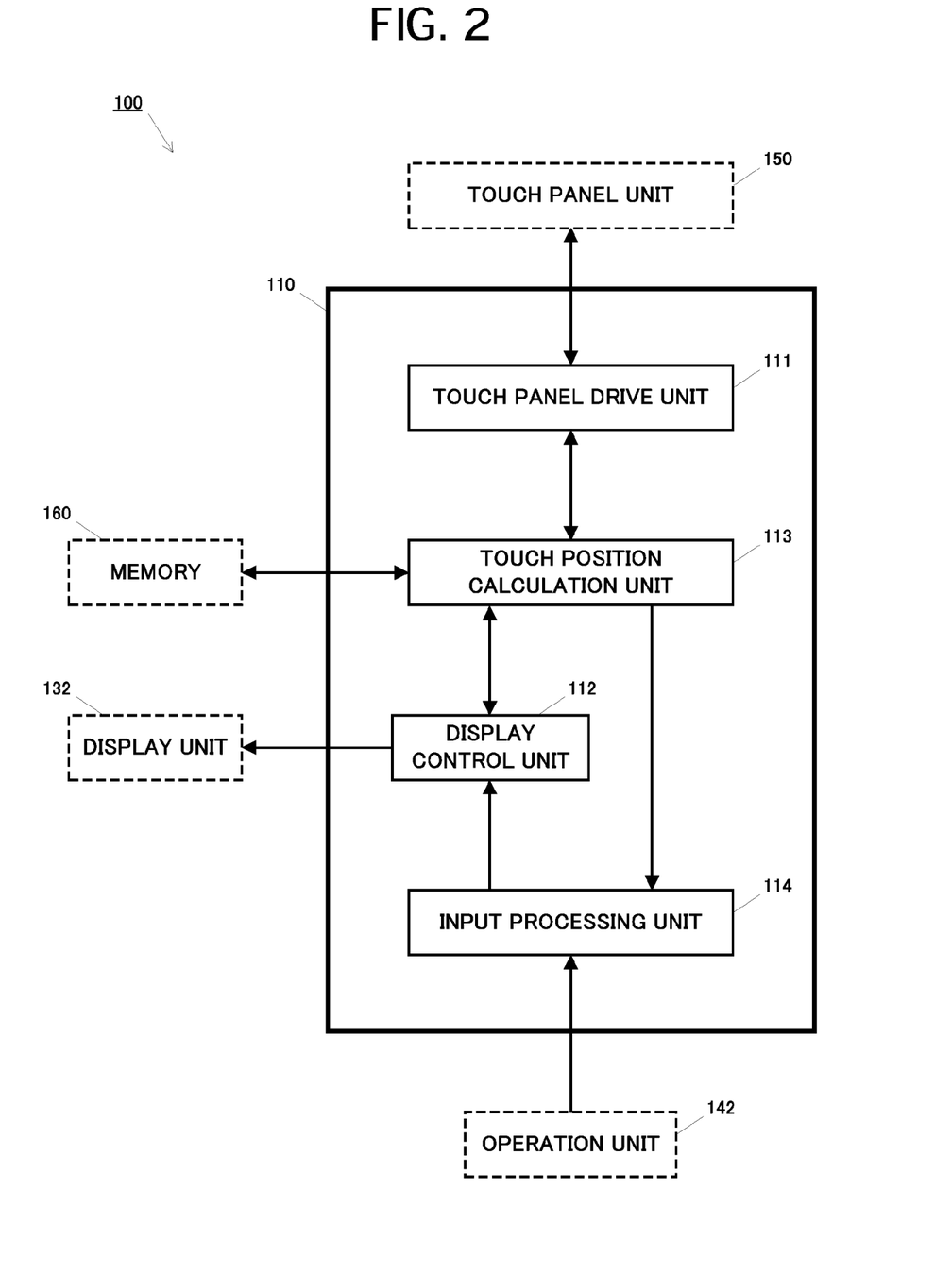
FIG. 2 is a functional block diagram showing the functional configuration realized by the control unit shown in FIG. 1.

Executing the operation programs stored in the memory 160, the control unit 110 functions as the components as shown in FIG. 2. As shown in the figure, the control unit 110 functions as a touch panel drive unit 111, a display control unit 112, a touch position calculation unit 113, an input processing unit 114, and so on.

The touch panel drive unit 111 drives the touch panel unit 150 to execute operations necessary for detecting the finger touch to the touch panel unit 150. Here, the touch panel drive unit 111 scans the touch sensor of the touch panel unit 150 and acquires signals indicating the capacitance from the touch panel unit 150.

The display control unit 112 generates various image signals to control the display unit 132 and then control the screen display on the display unit 132.

The touch position calculation unit 113 determines whether there is any finger touch to the touch panel unit 150 based on the capacitance signals the touch panel drive unit 111 has acquired from the touch panel unit 150. When there is any finger touch, calculation is made to identify the position of the finger touch (position on the coordinates of the display unit 132). Here, comparison is made between the detection signal intensities of multiple electrodes indicating any change in the capacitance and a threshold to determine whether there is any finger touch and the weighted average of the detection signal intensities is calculated to identify the position of the finger touch.

Furthermore, the touch position calculation unit 113 acquires from the display control unit 112 display state information indicating the display state of the display unit 132 at the time of calculating the touch position, and changes the threshold used in the calculation according to the display state of the display unit so as to reduce touch detection errors.

The input processing unit 114 conducts various operations according to input contents, such as transition of display screens of the display unit 132, based on input signals from the operation unit 142 and the touch position calculated by the touch position calculation unit 113.

In this embodiment, the above functional components are logically realized by the control unit 110. However, they can physically be realized by dedicated circuits such as ASICs (application specific integrated circuits). Particularly, the function of the touch position calculation unit 113 can be realized by an IC circuit driving the touch sensor of the touch panel unit 150. The threshold and condition necessary for calculating the position can be stored in a memory element contained in such an IC circuit.

The above-described components of the mobile communication terminal 100 are essential components for realizing the present invention. Other components necessary for basic functions of a mobile communication terminal and components necessary for various additional functions are provided as necessary.

Operation of the mobile communication terminal 100 having the above-described configuration will be described hereafter. Here, the touch panel unit 150 is used for input to the mobile communication terminal 100.

Figure 3A:
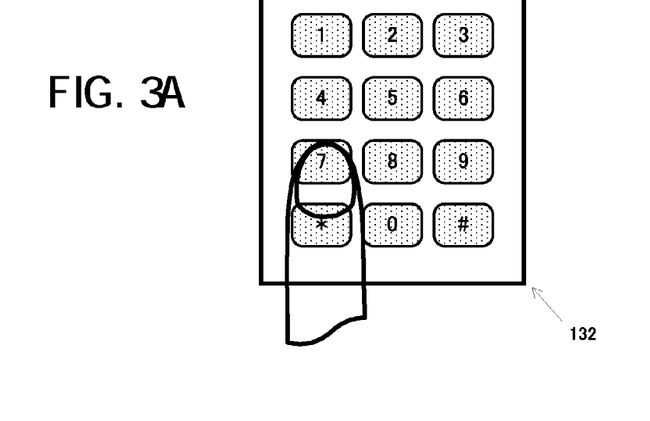
FIG. 3A schematically shows a finger touch to the touch panel, FIG. 3B schematically shows a finger touch detection state.

The input operation using the above-described touch panel is described hereafter with reference to FIGS. 3A to 3D. Here, it is assumed that a numeric keypad screen as shown in FIG. 3A is displayed on the display unit 132 and numbers are input by touching the numeric keypad (FIG. 3A shows a key "7" being touched).

Figure 3B:
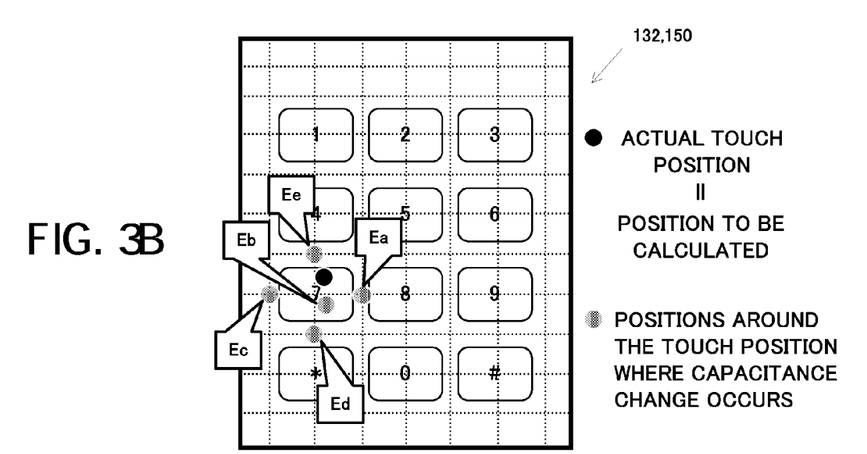

The touch sensor constituting the touch panel unit 150 consists of a matrix of electrodes on the display screen of the display unit 132 as shown in FIG. 3B. Here, with the key "7" being touched, some change in the capacitance is detected at multiple electrodes around the key "7" as shown in FIG. 3B. In other words, a finger touch causes detection signals to occur not only at a single actual touch position but also at multiple surrounding electrodes (electrodes Ea to Ee).

The touch position calculation unit 113 performs calculation using multiple such detection signals to obtain the coordinates indicating the actual touch position. In such a case, since some capacitance change may sometimes be caused by display noise of the display unit 132, the intensity of the detection signal (detected intensity) and a threshold for regarding as noise ("threshold THn" hereafter) are compared to determine where the capacitance change is caused by a touch such as a finger touch or by noise.

Generally, capacitance change by noise is smaller than capacitance change by a finger touch. Then, here, for simplicity, capacitance change by noise is assumed and calculation for identifying the touch position is not performed when the detected intensity is lower than the threshold THn.

Figure 3C:
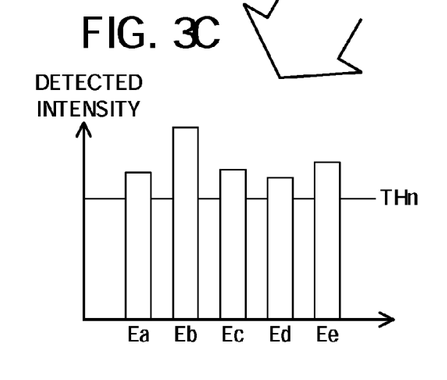
FIGS. 3C and 3D show the relationship between detected intensities and a threshold.

On the other hand, as shown in FIG. 3C, when the detected intensity exceeds the threshold THn, a touch such as a finger touch is assumed and touch position calculation is performed.

Figure 3D:
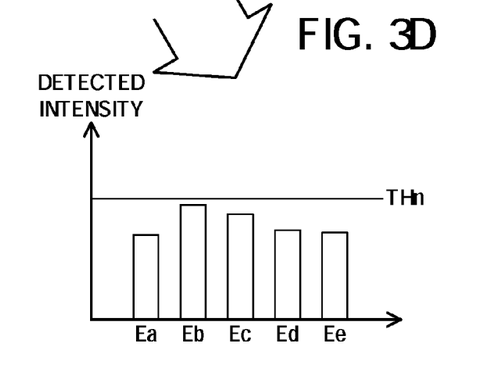

In some cases, the detected intensity may not reach the threshold THn even though a touch such as a finger touch is made as shown in FIG. 3D. In such a case, touch position calculation is not performed and no screen transition occurs in spite of the user making a touch. Such a state is termed "detection error" in this embodiment. Such a detection error occurs because the detected intensity is diminished under the influence of noise. This embodiment focuses on display noise of the display unit 132 as noise affecting the detected intensity.

Figure 4A:
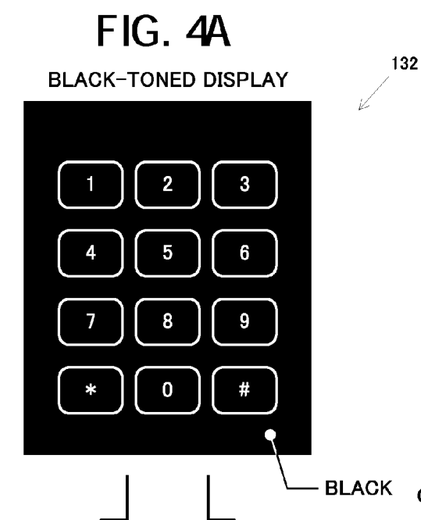
FIG. 4A shows a black-toned display.
Figure 4B:
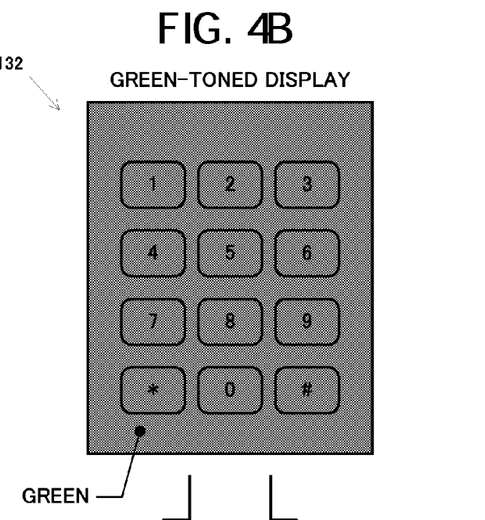
FIG. 4B shows a green-toned display, FIG. 4C schematically shows the applied voltage in the case of black-toned display, FIG. 4D schematically shows the applied voltage in the case of green-toned display.

Display noise of the display unit 132 will be explained with reference to FIGS. 4A to 4F. As described above, the display unit 132 of this embodiment employs a normally black liquid crystal display panel. In such a case, there is a significant difference in the voltage applied to R, G, and B cells between a display screen that mostly displays "black" (black-toned display) as shown in FIG. 4A and a display screen that mostly displays "green" (green-toned display) as shown in FIG. 4B.

In practice, an alternating current of corresponding positive and negative voltages is used for driving. Here, for simplicity, only the positive voltage is shown for explanation (the same applies below).

Figure 4C:
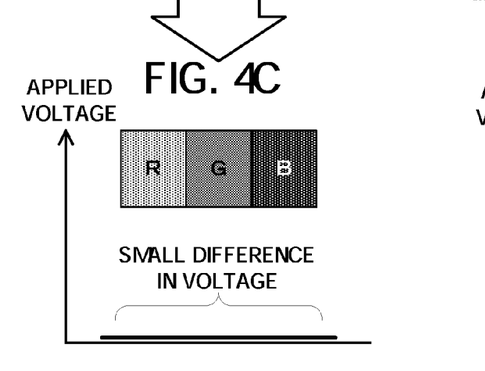

More specifically, when an array of R, G, and B cells is provided, a voltage of 0 is applied to the R, G, and B cells to display "black" as shown in FIG. 4C; therefore, the difference in voltage between adjacent pixels is the smallest.

Figure 4D:
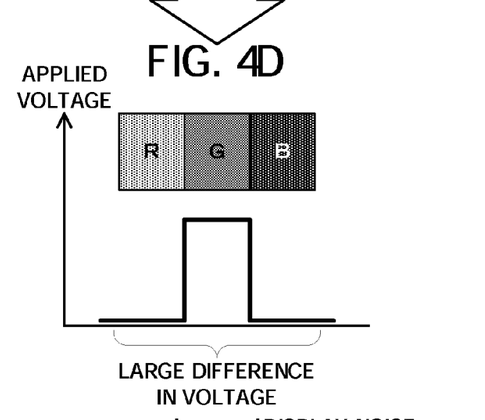
Figure 4E:
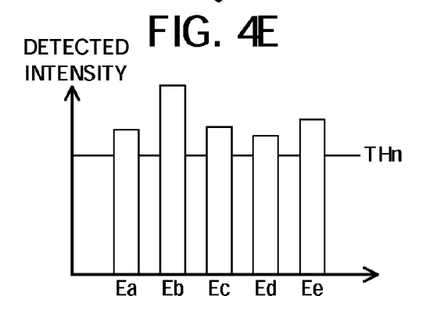
FIG. 4E shows the relationship between detected intensities and a threshold in the case of black-toned display.
Figure 4F:
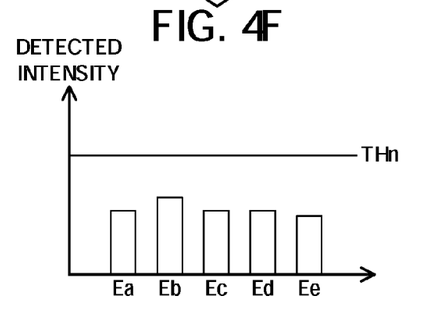
FIG. 4F shows the relationship between detected intensities and a threshold in the case of green-toned display.

On the other hand, for displaying "green," only the voltage applied to the G cell is higher than the voltage applied to the R and B cells; therefore, the difference in voltage between adjacent pixels is larger. When the fluctuation in voltage between adjacent R, G, and B pixels is larger as in this case, EMI (ElectroMagnetic Interference) noise occurs and constantly destabilizes baseline signals of the touch sensor. Consequently, the detected intensity of capacitance after finger touches fluctuates and may be treated as a detection error in a conventional threshold setting.

However, the pattern of voltage fluctuation responsible for EMI noise can be predicted from the applied voltage according to the display color. If the threshold is properly changed (switched) in accordance with the display state at the time of touch detection operation, detection errors can be reduced. A method of reducing touch detection errors from such a viewpoint will be described hereafter.

Embodiment 1

In this embodiment, the threshold THn is properly changed in accordance with the screen design (for example, a coloration pattern) displayed on the display unit 132 so as to reduce touch detection errors. "Touch input process (1)" executed for realizing such an operation will be described with reference to the flowchart shown in FIG. 5. The "touch input process (1)" starts when the touch input is enabled, for example when a screen allowing input through the touch panel unit 150 is displayed on the display unit 132.

Figure 5:
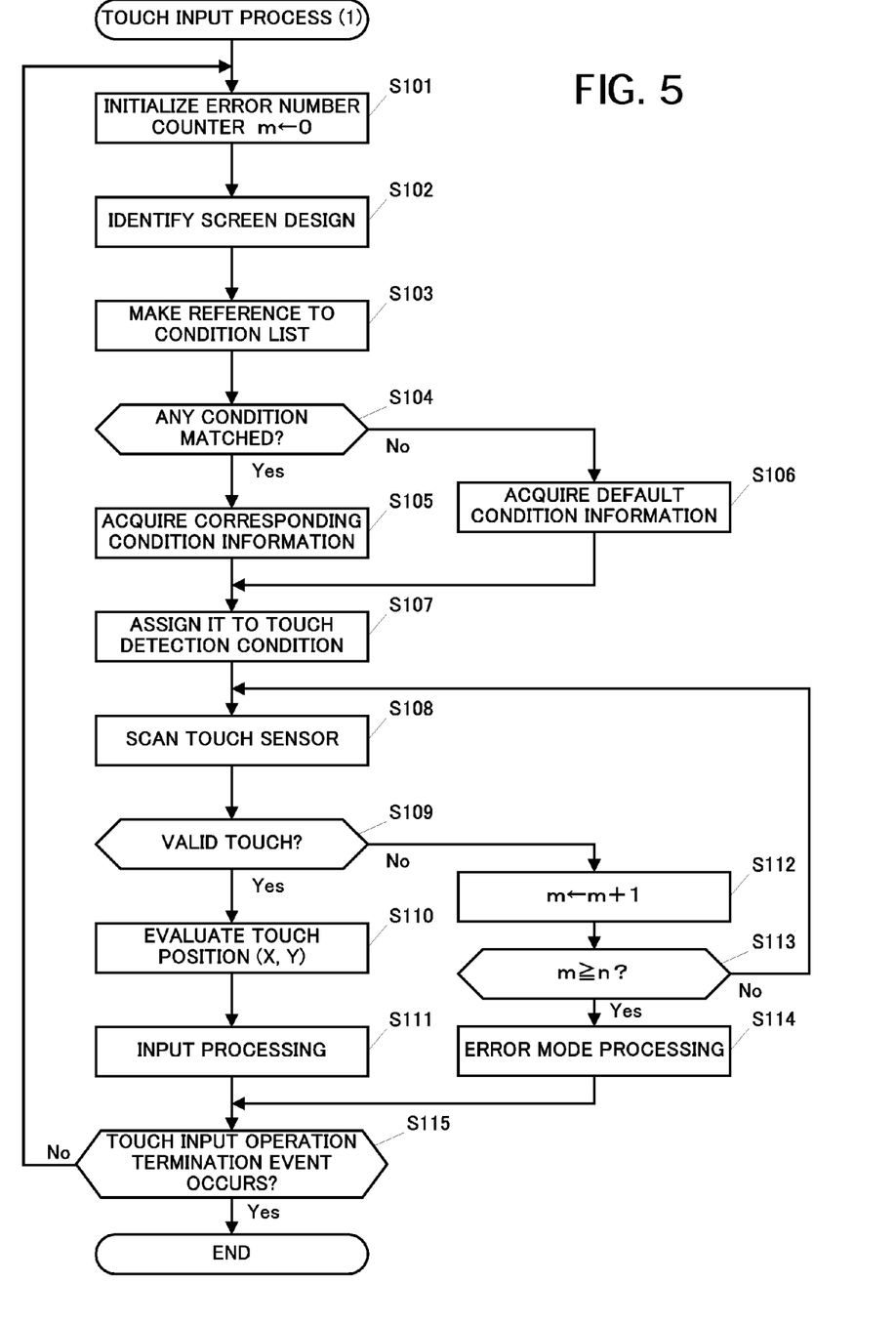
FIG. 5 is a flowchart for explaining "Touch input process (1)" according to Embodiment 1 of the present invention.

After the process starts, first, the touch position calculation unit 113 initializes an error number counter m for counting the number of touch detection errors (Step S101). Here, it is initialized to an initial value "0."

After initializing the error number counter m, the touch position calculation unit 113 inquires of the display control unit 112 about the screen design of the screen currently displayed on the screen 132. Here, the screen design is typified by information indicating the type of coloration pattern of display colors constituting the screen ("screen design information" hereafter) such as a black-toned screen and green-toned screen as exemplified in FIG. 4.

In response to the inquiry from the touch position calculation unit 113, the display control unit 112 informs the touch position calculation unit 113 of the screen design information corresponding to the current display screen. The touch position calculation unit 113 identifies the screen design of the screen currently displayed on the display unit 132 based on the screen design information informed from the display control unit 112.

Figure 6:
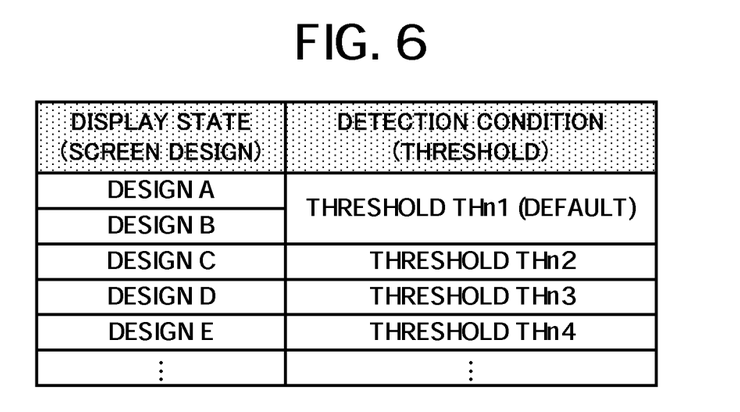
FIG. 6 is an illustration showing a "condition list" to which reference is made in the "touch input process (1)" shown in FIG. 5.

After identifying the screen design, the touch position calculation unit 113 accesses the memory 160 and makes reference to a "condition list" stored therein (Step S103). FIG. 6 shows an example of the "condition list." As shown in the figure, the "condition list" of this embodiment associates each typified screen design with a threshold THn.

The threshold THn is used to determine whether the capacitance change on the touch panel is caused by a finger touch or by noise as described above. In this embodiment, different thresholds THn (thresholds THn1 to THnM (M is an integer)) are prepared for different screen designs (coloration patterns). The association between screen designs and thresholds THn is created through experiments in advance. Here, for example, a threshold that can apply to multiple screen designs among the thresholds THn is used as a default value.

The touch position calculation unit 113 searches the condition list for a threshold THn (detection condition) corresponding to the screen design identified in Step S102 (Step S104) and, if found (Step S104: Yes), acquires the threshold THn associated with the screen design information (Step S105).

On the other hand, no corresponding screen design information may be found on the condition list, for example, when a screen design that did not exist when manufactured is added or when a user-customized screen design is used. In such a case (Step S104: No), the touch position calculation unit 113 acquires a threshold THn set up as a default value (Step S106).

The touch position calculation unit 113 sets up a threshold THn corresponding to the screen design from the threshold THn (detection condition) acquired in Step S105 or S106 as the touch detection condition to determine whether the capacitance change on the touch panel is caused by a finger touch or by noise as described above (Step S107). Here, for simplicity, the threshold THn (detection condition) is also used as a threshold for determining whether the position calculation is performed after a touch such as a finger touch is detected.

Setting up a threshold THn corresponding to the screen design as the touch detection condition, the touch position calculation unit 113 instructs the touch panel drive unit 111 to start scanning the touch sensor. In such a case, the touch panel drive unit 111 drives and controls the touch sensor of the touch panel unit 150 according to instructions from the touch position calculation unit 113 and starts scanning for detecting any touch (Step S108). During the scanning, signals indicating capacitance change detected at electrodes of the touch sensor (detected intensity) are supplied to the touch position calculation unit 113.

The touch position calculation unit 113 compares the value of the supplied detected intensity with the threshold THn set up as the touch detection condition in Step S107 and determines whether there is a touch such as a finger touch ("valid touch" hereafter) (Step S109). Here, the touch position calculation unit 113 affirms a valid touch, for example, when a given rate (for example, 5%) or higher or a given number (for example, one for a fine stylus, not a finger) or more of signals among the intensity detection signals coming from multiple electrodes and indicating any capacitance change indicate a detected intensity exceeding the threshold THn.

On the other hand, the touch position calculation unit 113 does not affirm a valid touch when less than a given rate or less than a given number of detected intensity signals indicate a detected intensity exceeding the threshold THn. For example, when none of the detected intensities indicated by all intensity detection signals reaches the threshold THn, the touch position calculation unit 113 assumes that the capacitance change is caused by noise and does not affirm a valid touch.

When it is a valid touch (Step S109: Yes), the touch position calculation unit 113 calculates (evaluates) the weighted average of detected intensities equal to or higher than the threshold THn among the signals from electrodes to obtain the coordinates of the touch position (Step S110) and notifies the input processing unit 114 of it.

Here, it is possible to set up another threshold lower than the threshold THn and calculate the position using detection signals higher than that threshold among the signals from electrodes.

The input processing unit 114 performs input processing according to the touch position informed from the touch position calculation unit 113 (Step S111). For example, when the touch position corresponding to a numeric key "7" is detected, the input processing unit 114 performs the input of a number "7" and related display operation.

On the other hand, when it is not a valid touch (Step S109: No), the touch position calculation unit 113 assumes a touch detection error and increases the error number counter m by +1 for counting the number of errors (Step S112).

Here, the touch position calculation unit 113 determines whether the value indicated by the error number counter m after +1 is added is equal to or greater than n, the upper limit of acceptable number of errors (Step S113). When it is lower than the acceptable number of errors (Step S113: No), the touch position calculation unit 113 repeats the procedures in Step S108 and subsequent steps for performing the touch detection operation once again.

If a valid touch is detected in the above touch detection operation (Step S109: Yes), the above-described touch position calculation (Step S110) and input processing (Step S111) are performed. If no valid touch is detected (Step S109: No), the error number counter m is successively increased (Step S112).

Consequently, when the number of errors is equal to or greater than the acceptable number of errors (Step S113: Yes), the touch position calculation unit 113 performs an error mode processing in collaboration with the display control unit 112 (Step S114). In other words, since touch detection errors occur even though a threshold THn taking into consideration display noise due to screen design is set up, some factor other than display noise has possibly occurred (for example, failure of the touch panel unit 150). Therefore, the touch position calculation unit 113 performs a display operation for calling for attention or switches to an input method other than the touch panel.

The above procedures are repeated until any touch input termination event such as transition to a screen to which the touch input is not assigned occurs (Step S115: No) while the threshold is changed in accordance with the screen design as needed, thereby reducing touch detection errors due to influence of display noise originating from the screen design. Then, when any touch input operation termination event occurs (Step S115: Yes), the process ends.

As described above, in the process of this embodiment, the threshold (detection condition) used in touch detection is changed in accordance with the screen design based on display colors as needed, thereby reducing touch detection errors due to display noise originating from display panel drive operation different depending on the display color.

Embodiment 2

In the above Embodiment 1, the threshold (detection condition) used in touch detection is changed in accordance with the screen design based on display colors. However, for example, some screen displaying an image consisting of a mixture of many display colors such as a photographic image may not be typified based on the display color.

Furthermore, in the above Embodiment 1, influence of display noise originating from the difference in voltage between R, G, and B cells is taken into consideration. Display noise also varies depending on the applied voltage level over the entire screen.

In this embodiment, a method for reducing touch detection errors in the above cases will be described. "Touch input process (2)" executed in this case will be described with reference to the flowchart shown in FIG. 7. The "touch input process (2)" starts when the touch input is enabled as in the "touch input process (1)" in Embodiment 1.

Figure 7:
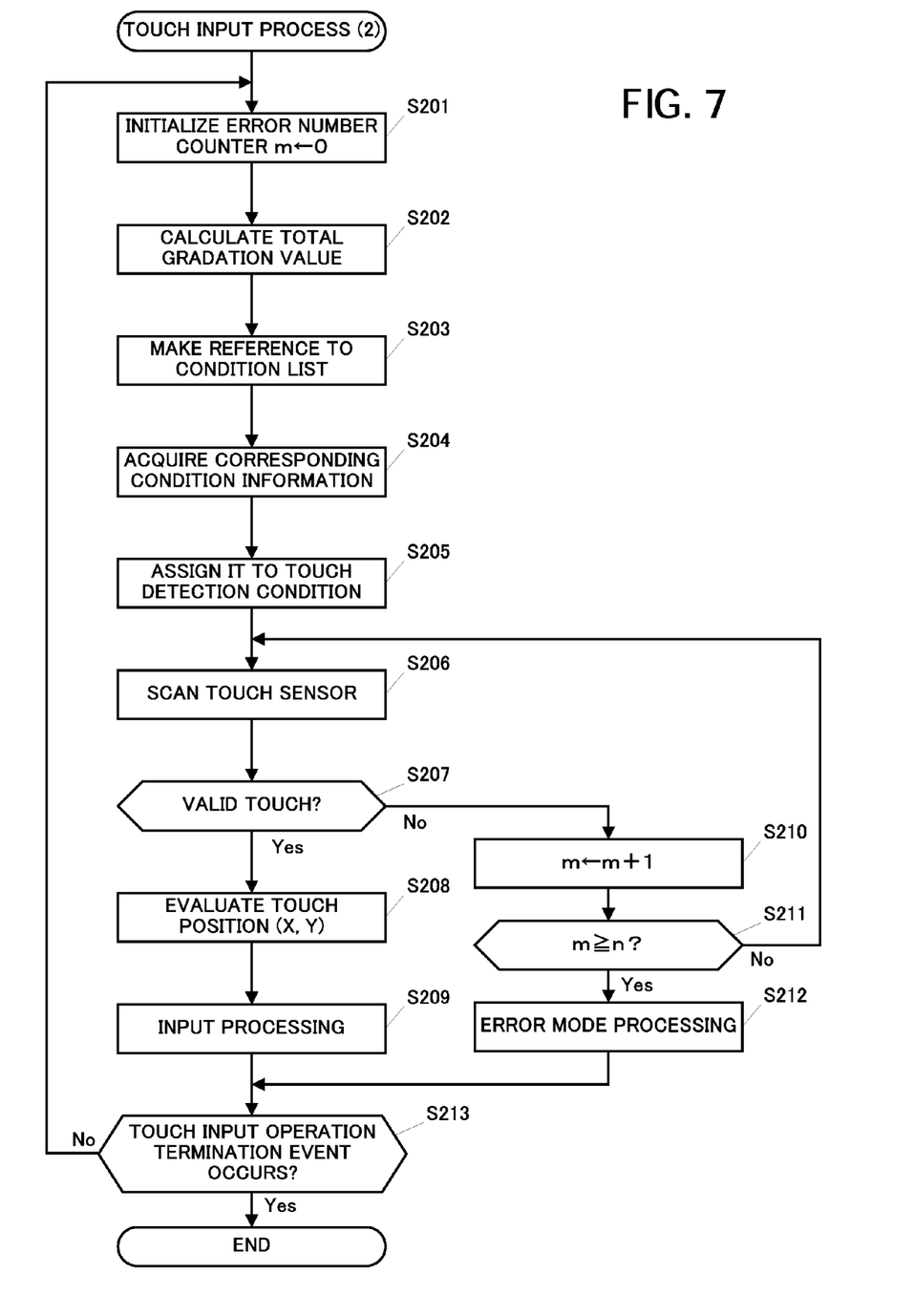
FIG. 7 is a flowchart for explaining "Touch input process (2)" according to Embodiment 2 of the present invention.

After the process starts, first, the touch position calculation unit 113 initializes an error number counter m for counting the number of touch detection errors to "0" (Step S201).

After initializing the error number counter m, the touch position calculation unit 113 inquires of the display control unit 112 about RGB histogram information of the display on the display unit 132. The RGB histogram information is information indicating the distribution of gradation values at all pixels. For example, for 24-bit RGB display capability, an eight-bit gradation value (0 to 255) is set for each of R, G, and B colors at each pixel.

The display control unit 112 informs the touch position calculation unit 113 of the RGB histogram information. The RGB histogram information is calculated using a known technique such as histogram display available in reproducing an image captured by a digital camera.

The touch position calculation unit 113 calculates the total gradation value based on the RGB histogram information obtained from the display control unit 112 (Step S202). The "total gradation value" is the total of gradation values of R, G, and B colors indicated by the RGB histogram information (here, the total gradation value is calculated based on the histogram information; however, it is not always necessary to calculate it from the histogram information as long as the total gradation value is obtained). The total gradation value has a specific relationship with the voltage applied to the display unit 132. The relationship between the total gradation value and applied voltage will be described with reference to FIG. 8A.

Figure 8A:
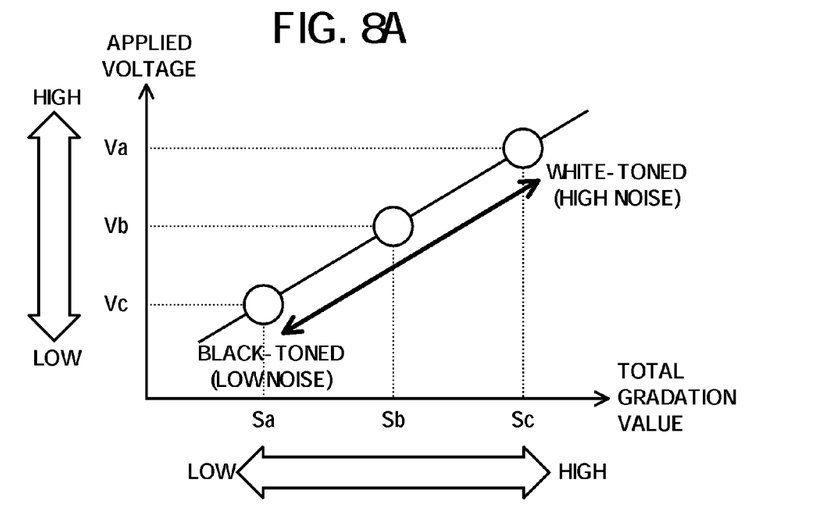
FIG. 8A shows the relationship between applied voltage and total gradation value.

Here, as described above, a normally black display panel is used. Then, the applied voltage is the lowest in the case of black-toned wherein the entire screen displays "black" while it is the highest in the case of white-toned wherein the entire screen displays "white." In such a case, since the gradation value has a positive correlation to the applied voltage (here, in proportion to it for simplicity), the total gradation value level and the applied voltage level have a positive correlation.

Here, it is known that noise to the touch panel unit 150 is increased as the voltage applied to the display panel is raised. Therefore, the noise to the touch panel unit 150 is larger when the total gradation value is higher and the noise to the touch panel unit 150 is smaller when the total gradation value is lower.

Figure 8B:
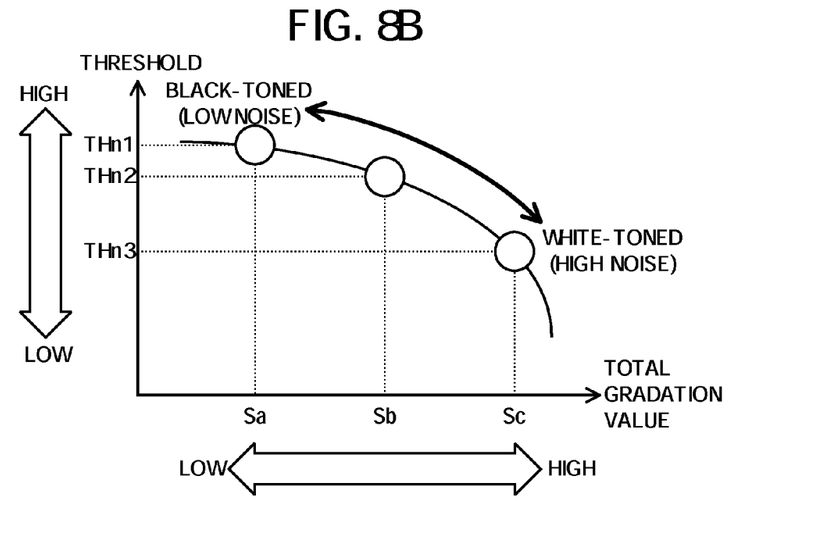
FIG. 8B shows the relationship between total gradation value and threshold.

Therefore, the relationship between multiple thresholds THn set up in consideration of noise to the touch panel unit 150 and the total gradation values as shown in FIG. 8B is established. More specifically, the total gradation value corresponding to a high display noise screen is associated with a low threshold THn and the total gradation value corresponding to a low display noise screen is associated with a high threshold THn. A threshold THn is set up in correspondence with the total gradation value calculated in Step S202 based on such a relationship, whereby touch detection errors due to influence of display noise can be reduced.

Figure 8C:
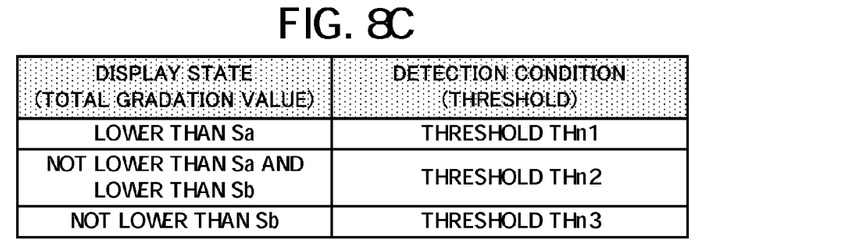
FIG. 8C shows a "condition list" to which reference is made in the "touch input process (2)"

In this embodiment, a condition list as shown in FIG. 8C is prepared in the memory 160. The condition list of this embodiment associates total gradation value ranges with corresponding thresholds THn as shown in the figure. This correspondence is obtained from experiments in advance.

The touch position calculation unit 113 makes reference to the condition list stored in the memory 160 (Step S203), acquires a threshold THn (condition information) corresponding to the total gradation value calculated in Step S202 (Step S204), and assigns it to the touch detection condition used in touch detection (Step S205).

After the touch detection condition is set up based on the total gradation value as described above, the same procedures as in the "touch input process (1)" in Embodiment 1 are performed (Steps S206 to S213). In other words, when a valid touch is assumed from comparison with the set threshold THn, the touch position calculation and input processing are performed. When the number of touch detection errors is equal to or greater than the acceptable number of times, the error mode processing is performed.

With the above process, a threshold (detection condition) suitable for touch detection is set up for any display screen, more effectively reducing touch detection errors.

Here, the explanation is made using a divisional condition list including three divisions as shown in FIG. 8C. The condition can be changed more slightly and continuously based on the relationship in FIG. 8B.

Embodiment 3

In the above embodiment, a threshold (detection condition) taking display noise into consideration is set up for scanning the touch sensor. It is possible to change the threshold (detection condition) when a touch detection error occurs.

Figure 9:
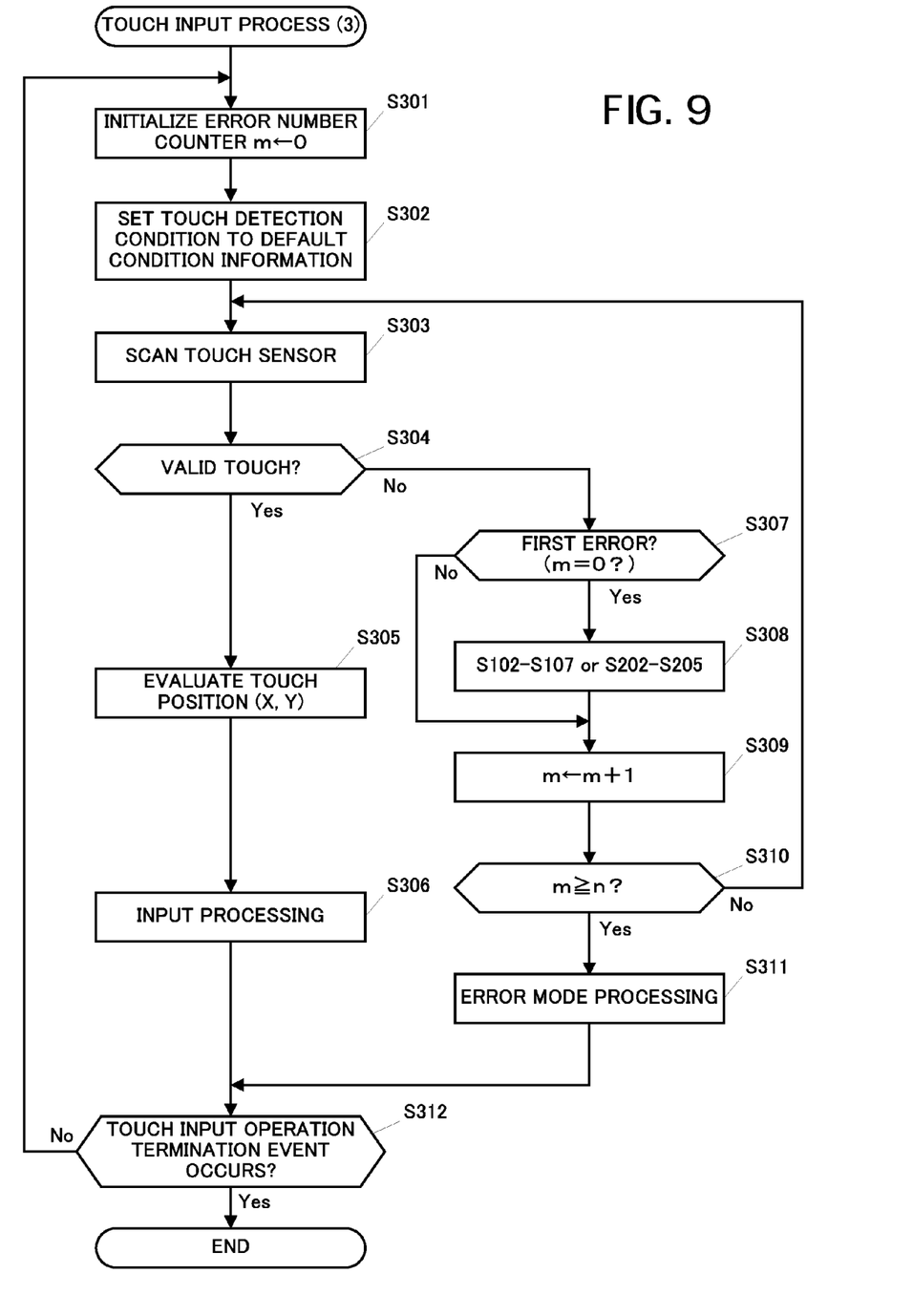
FIG. 9 is a flowchart for explaining "Touch input process (3)" according to Embodiment 3 of the present invention.

"Touch input process (3)" embodying the above case will be described with reference to the flowchart shown in FIG. 9. In the touch detection operation of the "touch input process (3)," a threshold is set up either in accordance with the screen design as exemplified in Embodiment 1 or in accordance with the total gradation value as exemplified in Embodiment 2.

After the process starts, the touch position calculation unit 113 initializes the error number counter m (Step S301) and makes reference to the condition list stored in the memory 160. Here, the touch detection condition is set to the default condition information (default threshold THn) set up in the condition list according to the threshold setting method employed (Step S302). When the method exemplified in Embodiment 2 is employed, the default condition information may be a threshold THn corresponding to the intermediate total gradation value ("a threshold THn2 in FIG. 8C").

After the touch detection condition is set to the default condition information (threshold THn), the scanning of the touch sensor starts (Step S303). Then, the touch position calculation unit 113 compares the detected intensities indicated by detection signals with the threshold THn as the touch detection condition set up in Step S302 and determines whether it is a valid touch (Step S304).

When a valid touch is detected from comparison with the default threshold THn (Step S340: Yes), the touch position calculation (Step S305) and input processing (Step S306) are performed.

When it is not a valid touch (Step S304: No), the touch position calculation unit 113 determines whether this is the first error based on the error number counter m (Step S307).

When it is the first error (Step S307: Yes), the touch position calculation unit 113 performs the procedures in Steps S102 to S107 in the "touch input process (1)" (FIG. 5) when the method based on the screen design exemplified in Embodiment 1 is employed or performs the procedures in Steps S202 to S205 in the "touch input process (2)" (FIG. 7) when the method based on the total gradation value exemplified in Embodiment 2 is employed (Step S308).

In other words, the touch position calculation unit 113 sets up a threshold THn corresponding to the screen design or the total gradation value at the time as the touch detection condition.

In this way, when the first error occurs, the threshold THn (detection condition) is changed to a threshold THn taking influence of display noise into consideration. Then, the touch position calculation unit 113 increases the error number counter m by +1 (Step S309) and determines whether the value after +1 is added is equal to or greater than the acceptable number of times n (Step S310). Here, this is the first error and the number of errors is less than n. In such a case (Step S310: No), the procedures in Step S303 and subsequent steps are repeated. In other words, the touch detection using the threshold THn changed in Step S308 is performed.

In such a case, if a valid touch is not detected (Step S304: No), it is not the first error (Step S307: No). Then, the error number counter m is increased without further changing the threshold THn (Step S309). Consequently, when the error number counter m is equal to or greater than the acceptable number of times (Step S310: Yes), an error mode processing as exemplified in Embodiment 1 is performed (Step S311).

The above procedures are repeated until any touch input operation termination event occurs (Step S312: No). On the other hand, when any touch input operation termination event occurs (Step S312: Yes), the process ends.

With the above process, the threshold (detection condition) is changed only when a touch detection error occurs, whereby the quantity of processing for touch input is reduced and the processing speed is improved.

As described above, touch detection errors on the touch panel due to display noise in a display unit can be reduced by applying the present invention as in the above embodiments.

Here, the touch detection condition (threshold) used in touch detection is determined based on the display state indicating the screen design or the applied voltage (total gradation value) relating to occurrence of display noise, whereby touch detection errors can be reduced in a stable manner.

When the touch detection condition (threshold) is determined in accordance with the screen design, typified information is used, whereby touch detection errors can more easily be reduced.

On the other hand, when the touch detection condition (threshold) is determined in accordance with the applied voltage (total gradation value), touch detection errors can effectively be reduced even with screens that are not typified.

In these cases, information indicating the display state corresponding to display noise and touch detection conditions (thresholds) can be associated with each other and stored in advance so as to easily and quickly determine the touch detection condition (threshold).

The above embodiments are given by way of example and applications of the present invention are not confined thereto. Various applications are available and any forms of implementation falls under the scope of the present invention.

The touch position calculation unit 113 may calculate the gradation value for each of R, G, and B colors based on RGB histogram information obtained from the display control unit 112. The touch position calculation unit 113 may set up a threshold THn from any one or multiple gradation values among the gradation values of R, G, and B colors, not from the total gradation value of R, G, and B colors. For example, when the display screen is a green-toned display, the touch position calculation unit 113 may set up a threshold THn based on the gradation value of G color. Furthermore, when the display screen is a purple-toned display, the touch position calculation unit 113 may set up a threshold THn based on the two gradation values of R and B colors.

For example, in the above embodiments, a normally black display panel is described by way of example. The present invention is applicable to a so-called normally white display panel that displays "white" when the applied voltage is "0." Also in such a case, touch detection errors can be reduced by setting up a touch detection condition in accordance with the display color or the applied voltage (total gradation value) as in the above embodiments.

Figure 10:
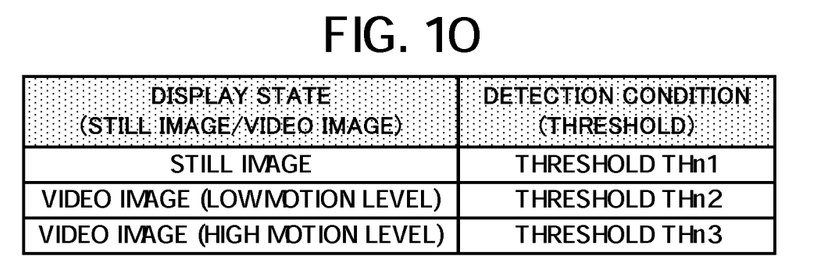
FIG. 10 is an illustration showing a "condition list" to which reference is made in an application of the present invention.

The contents of the condition lists shown in the above embodiments are given by way of example. Any number of items and any degree of details can be used. The content indicating the display state is not restricted to the screen design or total gradation value (applied voltage). Any item can be set up as long as it has a cause-and-effect relation to display noise affecting the touch detection. For example, when a video image is included in the display image, display noise is higher in video image display than in still image display. Furthermore, display noise increases as the motion level becomes higher. With such a relation, for example, as shown in FIG. 10, a condition list associating still images with a higher threshold THn1 and video images with lower thresholds THn2 or THn3 is prepared so as to reduce touch detection errors based on the type of display image.

Furthermore, a condition list can be used to change the threshold for determining whether the position calculation is performed.

For example, in the above embodiments, the present invention is applied to a mobile communication terminal as an electronic device. The electronic device is not restricted thereto. The present invention can be applied to any electronic device as long as it has a touch panel input function.

Furthermore, in the above embodiments, the touch panel is a capacitive touch panel. The present invention can be applied to other types of touch panels of which the detection accuracy is affected by noise relating to screen display so as to reduce touch detection errors.

The function of the input device of the present invention can be realized not only by an electronic device provided with a configuration regarding the present invention in advance but also by applying programs to a computer controlling an input device using a touch panel. In other words, the same programs as those executed by the control unit 110 exemplified in the above embodiments are applied to an existing input device or an electronic device having the input device and the computer of the device executes the programs to realize the same functions as the control unit 110, whereby the device functions as the input device of the present invention.

Such programs can be applied in any means. For example, the programs are stored in a memory medium such as a CD-ROM and memory card, or applied via a communication medium such as the Internet.

A combination of the methods described in the above embodiments can also be used. For example, when a touch detection error occurs after the threshold is changed based on the screen design as exemplified in Embodiment 1, the threshold may be determined based on the applied voltage (total gradation value) as exemplified in Embodiment 2.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A touch detection device including:
    a display unit providing screen display;
    a touch panel configured on the display screen of said display unit; and
    a touch detection unit detecting touch to said touch panel based on detection signals at said touch panel, wherein
    said touch detection device comprises a condition determination unit determining a touch detection condition based on the screen displayed by said display unit;
    said condition determination unit determines said touch detection condition based on a display state corresponding to display noise due to an image displayed on said screen display by said display unit and changes said touch detection condition when said display unit changes the image displayed on the screen display, wherein a predetermined display state is associated with a predetermined display noise; and
    said touch detection unit detects touch using the touch detection condition determined by said condition determination unit.

2. The touch detection device according to claim 1, wherein said condition determination unit determines a threshold for comparing with said detection signals as said touch detection condition.

3. The touch detection device according to claim 1, wherein said condition determination unit determines said touch detection condition based on the relationship between the image currently displayed on the screen display by said display unit and the display noise.

4. The touch detection device according to claim 1, wherein said condition determination unit determines said touch detection condition based on the relationship between the voltage applied to display the image by said display unit and the display noise.

5. The touch detection device according to claim 4, wherein said condition determination unit further comprises a calculation unit calculating the total gradation value of said screen and determines said touch detection condition based on the total gradation value calculated by said calculation unit.

6. The touch detection device according to claim 4, wherein said condition determination unit determines a lower threshold value as said touch detection condition when said applied voltage is higher.

7. The touch detection device according to claim 1, wherein said touch detection device further comprises an error detection unit detecting touch detection errors,
    said condition determination unit determines a touch detection condition based on the screen displayed by said display unit when said error detection unit detects a touch detection error, and
    said condition determination unit determines a given touch detection condition when said error detection unit detects no touch detection error.

8. The touch detection device according to claim 7, wherein said condition determination unit determines a touch detection condition based on the screen displayed by said display unit when said error detection unit detects a touch detection error for the first time.

9. The touch detection device according to claim 1, wherein said touch detection device further comprises a memory storing a condition list associating information indicating said display state with touch detection conditions, and said condition determination unit determines a touch detection condition based on the condition list stored in said memory.

10. The touch detection device according to claim 1, wherein a touch position calculation unit is configured to initialize an error number counter for counting a number of touch detection errors; and after initializing the error number counter, the touch position calculation unit inquires of a display control unit about an image currently displayed on said screen display.

11. The touch detection device according to claim 10, wherein after identifying the image displayed on said screen display, the touch position calculation unit accesses a memory and makes reference to a condition list stored therein and associates each said image with a threshold.

12. The touch detection device according to claim 11, wherein the threshold is used to determine whether a capacitance change on the touch panel is caused by a finger touch or by noise.

13. An electronic device comprising:
a touch detection device according to claim 1; and
an electronic device body housing the touch detection device.

14. A non-transitory computer-readable medium in which programs are recorded wherein the programs allow a computer controlling a touch detection device comprising:

a display unit providing screen display;

a touch panel configured on the display screen of said display unit; and a touch detection unit detecting touch to said touch panel based on detection signals at said touch panel to realize the following functions:

determining a touch detection condition based on a display state corresponding to display noise due to an image displayed on said screen display by said display unit;

changing said touch detection condition when said display unit changes the image displayed on the screen display, wherein a predetermined display state is associated with a predetermined display noise; and detecting touch using the determined touch detection condition.

* * * * *